June 3, 1924.

F. H. SLEEPER

PULLEY

Filed May 25, 1923

1,496,032

FRANK H. SLEEPER
BY Southgate Southgate
ATTORNEYS

Patented June 3, 1924.

1,496,032

UNITED STATES PATENT OFFICE.

FRANK H. SLEEPER, OF WORCESTER, MASSACHUSETTS, ASSIGNOR TO SLEEPER & HARTLEY, INC., OF WORCESTER, MASSACHUSETTS, A CORPORATION OF MASSACHUSETTS.

PULLEY.

Application filed May 25, 1923. Serial No. 641,477.

*To all whom it may concern:*

Be it known that I, FRANK H. SLEEPER, a citizen of the Dominion of Canada, residing at Worcester, in the county of Worcester and State of Massachusetts, have invented a new and useful Pulley, of which the following is a specification.

This invention relates to a pulley for transmitting power and the principal object thereof is to so construct the pulley that its diameter will be automatically varied in accordance with variations in the load. More specifically the invention involves the provision of a driving pulley for a belt transmission so arranged that when the load transmitted is increased the diameter of the pulley will be reduced to slow down the speed, and when the load is reduced the diameter of the pulley will be increased to increase the speed of the shaft to which the power is transmitted by it, or the provision of a driven pulley constructed in substantially the same way but so arranged that when the torque on its shaft increases the diameter of the pulley increases, so that its speed will decrease and vice versa.

The invention also involves features of construction by which these results are secured.

Reference is to be had to the accompanying drawings in which—

Figure 1:
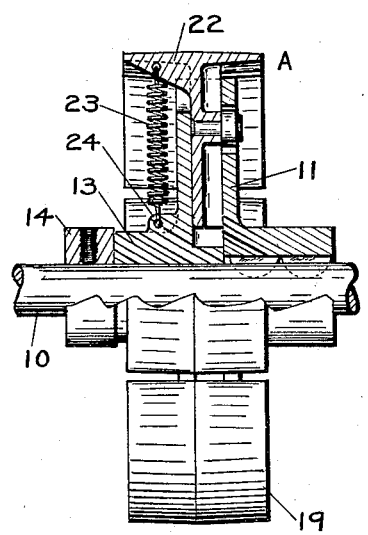
Fig. 1 is an elevation of a driven pulley constructed in accordance with this invention showing half of it in central section.
Figure 2:
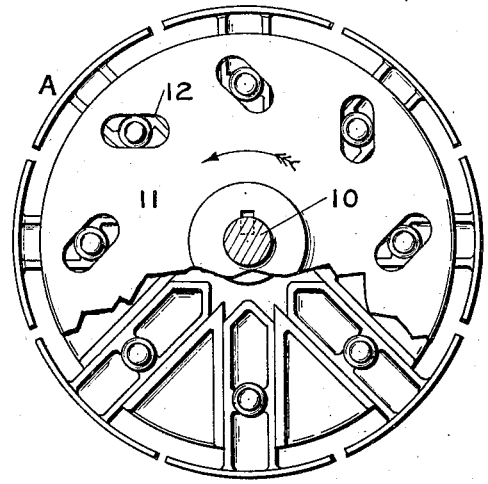
Fig. 2 is a side elevation of the same partly broken away to show interior construction.
Figure 3:
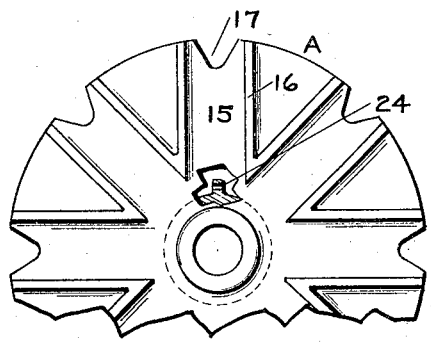
Fig. 3 is a side view of the guide disc thereof.
Figure 4:
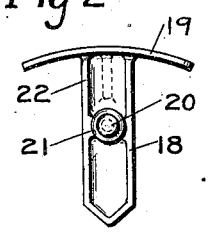
Fig. 4 is a similar view of one of the sections of the pulley rim and connected parts.

Referring first to the first four figures, I have shown the invention as applied to a driven pulley A. In this form the driven shaft 10 has keyed upon it the hub of a flat disc 11. This disc is provided with a series of cam slots 12, all located at equal definite angles to radial lines at those points.

Rotatably mounted on the driven shaft 10 is the hub 13 of the pulley. This hub is intended to be connected with the shaft through the disc 11 only. It is shown as bearing up against a collar 14 fixed to the shaft and as provided with a series of radial guides 15, each formed by two parallel walls or projections 16. I have shown notches 17 at the ends of these guides for a purpose to be described.

Mounted to move freely in the guides 15 are a series of slides 18. Each one of these has a pulley rim section 19, preferably integrally mounted on its end, and these sections taken together constitute the entire rim of the pulley. These slides are located in the guides 15 so that they can move radially therein for the purpose of increasing and decreasing the diameter of the pulley. Each slide is provided with a projection or stud 20 on which is rotatably mounted a cam roll 21. The number of these slides is equal to the number of cam slots 12 and each of these rolls 21 is placed in one of the cam slots.

At the rear of each slide is shown a web 22 for which the notches 17 are provided. One end of a spring 23 is secured to the web, the other end being secured to a projection 24 on the hub 13. These springs as shown in these figures are arranged radially and they are extension springs in this case. Any spring or other means can be used that will tend to resist all decrease in the speed of transmission. The springs 23 tend to hold the slides in toward the center and in that way they tend to resist increase in the size of the driven pulley and consequent reduction of the speed ratio. In this case they also resist the action of centrifugal force if the pulley is driven fast enough to bring that into play sufficiently to move these sections. I have described only two springs 23 and 33 both of them radial, but it will be understood that I can employ any means for resisting the changes in the diameter of the pulley within the scope of this invention. This means is arranged to resist decreases in the speed ratio.

It will be seen that power is transmitted from a belt running over the rim 19 of the pulley A through the several slides 18 to the rolls 21, the rolls, on account of engaging the slanting surfaces of the slots 12 will move outwardly on any increase in load or torque. Therefore the belt will transmit its power to the disc 11 and thus to the driven shaft 10 at a slower speed. This change in speed is governed automatically by the resistance on the driven shaft.

It will be seen further that whenever less resistance is placed on the shaft 10 the rolls, on account of the cam action of the walls of the slots 12 will tend to move inwardly. They can do this only by a relative motion in the slots toward the inner ends thereof. The effect of this is to move the whole slide in each case nearer the center and reduce the diameter of the pulley. As this pulley being described now is a driven pulley that will increase the speed ratio and drive the pulley faster. It is to be noted that, disregarding centrifugal force for the present, the only cause for the change in the diameter of the pulley is the change in the torque on the shaft.

Although I have mentioned centrifugal force I wish it to be understood that ordinarily I do not intend to drive this pulley fast enough to have the centrifugal force exert any appreciable influence on the diameter of the pulley.

Figure 5:
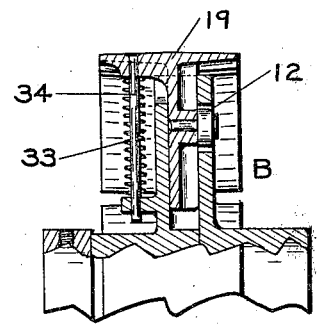
Fig. 5 is a view similar to Fig. 1 showing a driving pulley constructed on the same principle.

In applying this invention to a driving pulley B as shown in Fig. 5 all the elements are made in the same way preferably except that the spring 33 is a compression spring on a rod 34 which is radial. Now the shaft is the driver and the rim the driven element of this pulley. Therefore, an increase in the power required will tend to pull the sections of the pulley inwardly and reduce its size, thus slowing down the speed automatically.

Figure 6:
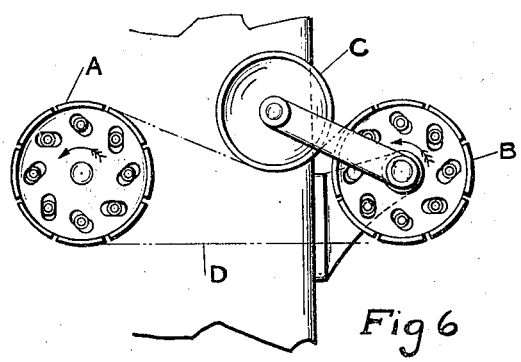
Fig. 6 is a side view showing one way in which the driving and driven pulleys illustrated in the other figures can be used for transmitting power.

In Fig. 6 I have shown the two pulleys A and B described above as employed in a single drive and shown the power transmitted from one to the other by the belt D with a take-up pulley C bearing on the belt between them. This provides for securing the desired results by the action of both pulleys co-operating with each other. Each one acts in the manner above described and their combined action secures the desired result.

Although I have illustrated and described only two forms of the invention I am aware of the fact that other modifications can be made therein by any person skilled in the art without departing from the scope of the invention as expressed in the claims. Therefore I do not wish to be limited to the details of construction herein shown and described, but what I do claim is:—

1. The combination with a shaft and a sectional rim expansion pulley loosely mounted thereon, of a disc fixed on the shaft, the pulley sections and the disc having angularly located slots and rolls engaging in the slots, whereby relative rotation of the pulley and shaft will change the size of the pulley, and yielding means for resisting motion of the pulley sections in a direction which would decrease the speed of transmission of power through the device.

2. In a pulley, the combination with outwardly and inwardly movable sections constituting the rim, of two hub members one loosely mounted on the shaft of the pulley and the other fixed to the shaft, one having slots at an angle to radii passing through them and the other having means entering said slots and movable out and in with the rim sections for transmitting a motion of rotation between the shaft and rim, whereby changes in torque will change the size of the pulley by moving the rim sections, and yielding means for assisting motion of the rim sections in a direction to increase the speed of transmission.

3. In an expansible pulley, the combination with a pair of hub members, one tight and the other loose on the pulley shaft, one having a series of radial guides, of a corresponding series of rigid rim sections spaced apart at their ends and each having a slide engaging the respective guides and capable of moving radially thereon, a corresponding number of springs always tending to move the sections in a direction to increase the speed ratio, and means independent of the springs for transmitting the power and for moving the rim sections radially in a direction to increase the speed ratio when the load decreases.

4. In an expansible pulley, the combination with a pair of hub members, one tight and the other loose on the pulley shaft, the loose one having a series of radial guides, of a corresponding series of rigid rim sections spaced apart at their ends and each having a slide engaging the respective guides and capable of moving radially thereon, a corresponding number of radially arranged springs connecting the rim sections with the loose hub member and always tending to move the sections in a direction to increase the speed ratio, and means constantly connected with the tight hub member for moving the rim sections radially in a direction to decrease the speed ratio when the load increases.

5. The combination with a shaft and an expansible driven pulley loosely mounted thereon, of a member fixedly secured to the shaft, and means adjustably and constantly connecting said member with the pulley for automatically increasing the diameter of the pulley upon the application of an increased load and decreasing the diameter upon a reduction of the load and yielding means for constantly tending to decrease the size of the pulley.

6. The combination with an expansible pulley and its shaft on which the pulley is mounted loosely, of a disc fixed on the shaft, and means connecting the pulley and disc for transmitting power, said means having co-operating parts for changing the diameter of the rim automatically in a direction to increase the speed of the driven shaft when the load decreases and decrease it when the load increases.

7. In a pulley, the combination with a disc tight on its shaft, a hub loose on the same shaft, the disc having cam slots arranged at an angle to a radial direction, slides mounted to move on the hub, and each having a section of a pulley rim thereon, a projection on each slide entering one of said cam slots and fitting it, said slots each being pitched in the direction to cause said projections to move in a direction to increase the speed of the driven shaft whenever the torque is reduced and decrease it when the torque is increased, and yielding means for resisting decreases in the speed ratio.

8. In a pulley, the combination with a disc tight on its shaft, a hub loose on the same shaft and having radial guides, the disc having an equal number of cam slots, slides mounted to move radially outwardly and inwardly in said guides, and each having a section of a pulley rim thereon, a projection on each slide entering one of said cam slots and fitting it, said slots each being arranged at an angle to a radial direction pitched in the direction to cause said projections to move in a radial direction to increase the speed of the driven shaft whenever the torque is reduced and decrease it when the torque is increased, and yielding means for resisting decreases in the speed ratio.

9. The combination with a driving and a driven shaft, of a disc tight on each shaft, a hub loose on each shaft and having guides, the disc having an equal number of cam slots, slides mounted to move outwardly and inwardly in said guides, and each having a section of a pulley rim thereon, a projection on each slide entering one of said cam slots, said slots each being arranged at an angle to a radial direction pitched in the direction to cause said rolls to move in a direction to increase the speed of the driven shaft whenever the torque is reduced and decrease it when the torque is increased, and yielding means for resisting decreases in the speed ratio.

In testimony whereof I have hereunto affixed my signature.

FRANK H. SLEEPER.